United States Patent [19]
Farmer et al.

[11] 3,897,152
[45] July 29, 1975

[54] LASER DOPPLER VELOCIMETER

[75] Inventors: William M. Farmer; James O. Hornkohl, both of Tullahoma, Tenn.

[73] Assignee: The United States of America as represented by the Secretary of the Air Force, Washington, D.C.

[22] Filed: Feb. 4, 1974

[21] Appl. No.: 439,663

[52] U.S. Cl. ................................. 356/28; 350/161
[51] Int. Cl. ............................................. G01p 3/36
[58] Field of Search ....... 350/160, 161; 356/28, 169

[56] References Cited
UNITED STATES PATENTS

| | | | |
|---|---|---|---|
| 3,297,876 | 1/1967 | De Maria | 350/161 |
| 3,529,886 | 9/1970 | Dixon et al. | 350/161 |
| 3,585,392 | 6/1971 | Korpel | 350/161 |
| 3,661,441 | 5/1972 | Uchida et al. | 350/161 |
| 3,723,004 | 3/1973 | Brayton | 356/28 |

OTHER PUBLICATIONS
Grant et al., Applied Otics, Vol. 12 No. 12, 12-1973, pp. 2913-2916.

*Primary Examiner*—Maynard R. Wilbur
*Assistant Examiner*—S. C. Buczinski
*Attorney, Agent, or Firm*—Joseph E. Rusz; Julian L. Siegel

[57] ABSTRACT

A beam from a laser penetrates a two-dimensional Bragg cell and is diffracted into four output beams each with different frequencies and focused to a point in moving media where two components of velocity are to be obtained. Polarization rotation plates can be used to intercept the four output beams from the two-dimensional Bragg cell in order to adjust the orientation of polarization which eliminates cross-talk. The scattered light from the probe point in the moving medium is optically collected and projected into a photomultiplier tube, the output thereof being fed to carrier frequency separation and doppler data processing electronics. The two-dimensional Bragg cell consists of a pair of right angle intersecting water columns with a pair of oscillating ultrasonic cyrstals located near the intersecting point and perpendicular to one each of the water columns. Light penetration from a laser beam is obtained by placing a pair of windows of optical quality on both sides of the cell's housing at the intersecting point of the water columns.

1 Claim, 3 Drawing Figures

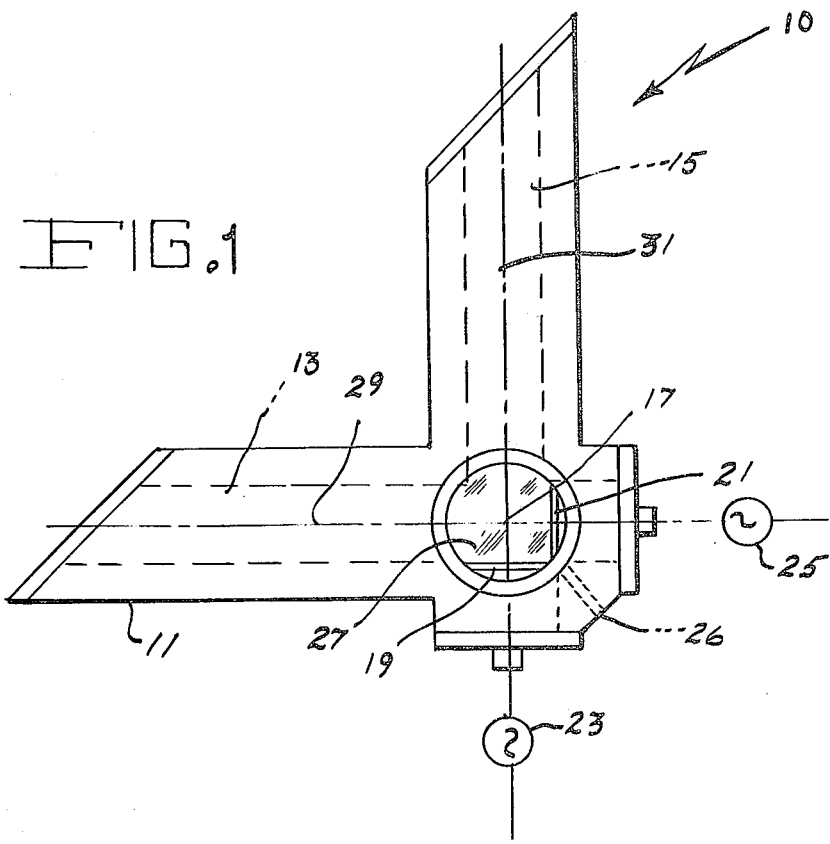
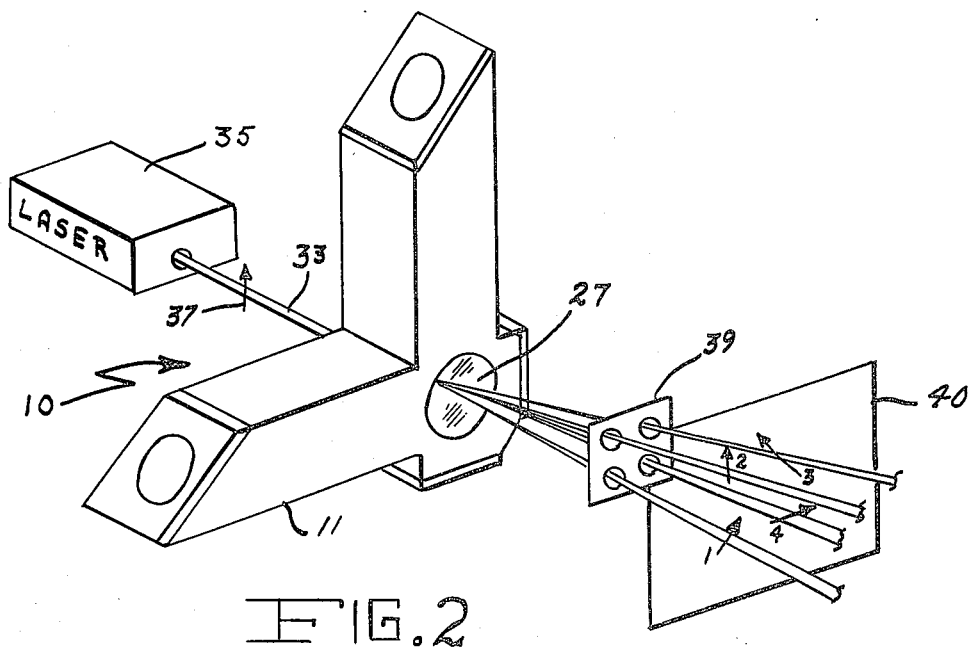

LASER DOPPLER VELOCIMETER

BACKGROUND OF THE INVENTION

This invention relates to the measurement of velocity of a flowing medium, and more particularly to a laser doppler velocimeter measuring fluid velocity in two components.

The present invention is an improvement over laser doppler velocimeters used in the past. Typical laser doppler velocimeters generally included a continuous wave laser beam focused at a probe point in the media where the velocity is to be measured. A portion of the beam passes through the media and a portion is also scattered. The moving particles of the medium which scatter the focused laser beam cause the frequency of the light to shift. This frequency shift is inversely proportional to the wavelength of the laser light and directly proportional to the index of refraction of the flowing media and a component of the velocity of the scattering particles which depend upon the magnitude and the cosine of the direction of the velocity.

In the invention disclosed herein the laser beam is obtained by diffraction, utilizing the Bragg effect which is explained in *Principles of Optics*, by Max Born and Emil Wolf, pp 593–609, (Pergamon Press, New York, 1965). The Bragg cell used in this invention is a two-dimensional Bragg cell as distinguished from the common nonself-aligning Bragg cell laser velocimeter such as that shown by M. K. Mazumder, *Applied Physics Letters*, 16, No. 11, 462, (1970).

Also, in the present invention only a single detector is required for both velocity components, since the components are separated electronically after signal detection and not optically before detection, as with previous systems.

SUMMARY OF THE INVENTION

The subject invention determines the velocity of a moving fluid in two components without disturbing the fluid's motion. A laser doppler velocimeter is disclosed which uses the Bragg principle in the form of a two-dimensional Bragg cell which is self-aligning. The velocimeter obtains a velocity direction specification and has a carrier frequency component separation in the signal receiver. This system eliminates the 180° ambiguity in the velocity vector sense inherent in the prior art laser doppler velocimeters.

It is therefore an object of this invention to provide a laser doppler velocimeter system that measures both magnitude and direction for two velocity components in a moving medium.

It is another object to provide a laser doppler velocity meter system that is self-aligning and can measure the velocity vector without 180° ambiguity in the direction of the velocity.

It is another object to provide a laser doppler velocimeter system that requires fewer optical components than previous laser doppler velocimeter systems.

It is still another object to provide a laser doppler velocimeter system that requires only a single detector for both velocity components.

These and other objects, advantages and features of the invention will become more apparent from the following description taken in connection with the illustrative embodiment in the accompanying drawings.

DESCRIPTION OF THE DRAWINGS

FIG. 1 is a side elevation view partly in schematic of a two-dimensional Bragg cell which is used in this invention;

FIG. 2 is a perspective view showing the two-dimensional Bragg cell with the four output beams.

DETAILED DESCRIPTION OF THE PREFERRED EMBODIMENT

Figure 3:
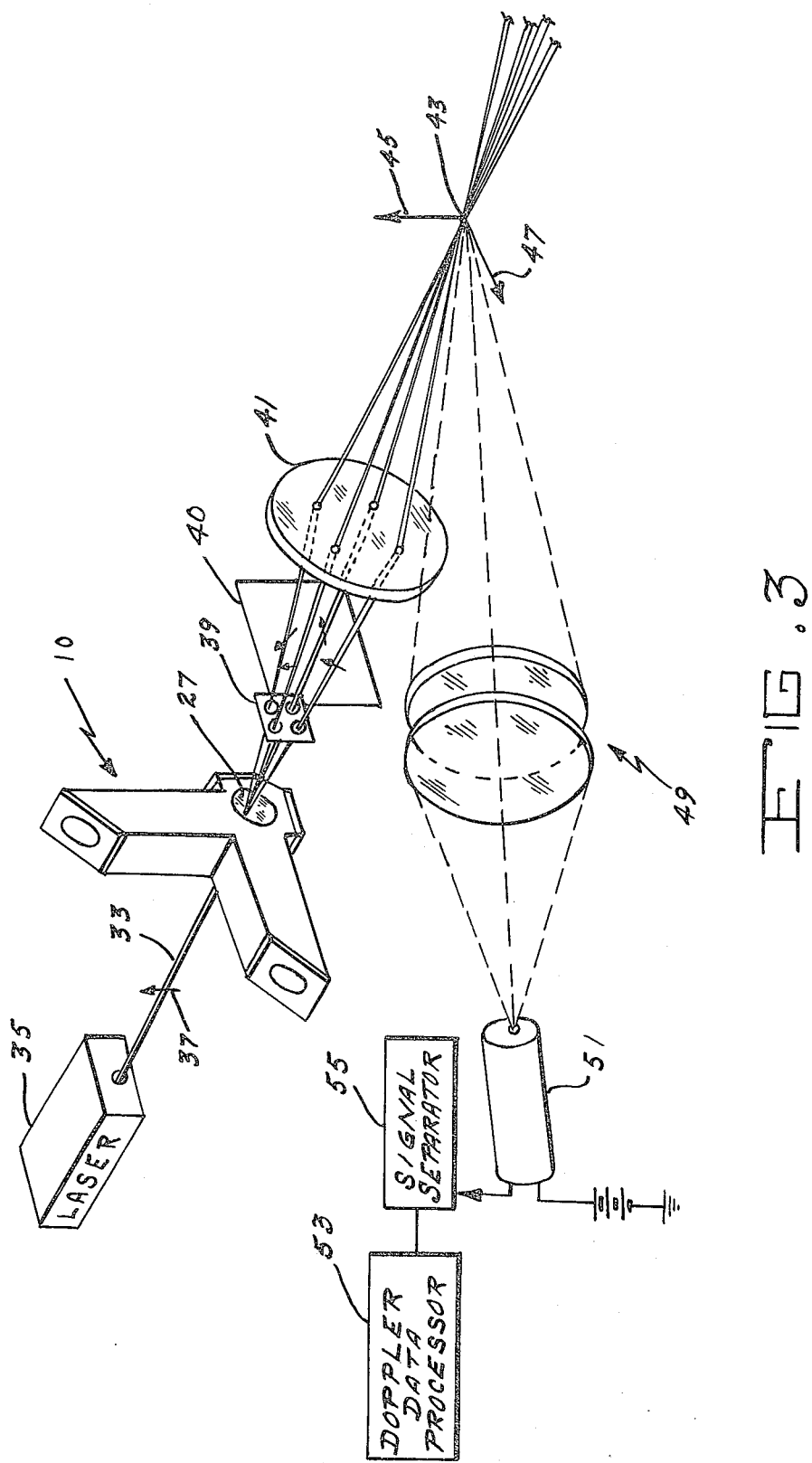
FIG. 3 is a perspective view partly in schematic showing an embodiment of the system of the invention.

The two-dimensional Bragg cell used in this invention is the subject of my copending application filed at the same date. As shown in FIG. 1, this Bragg cell 10 includes common housing 11 containing two intersecting water columns 13 and 15 at right angles to each other. Located near the point of intersection of water columns 13 and 15 are Bragg crystal 19 which is perpendicular to water column 15 and Bragg crystal 21 which is perpendicular to water column 13. These crystals can be made of quartz. Bragg crystal 19 is activated by oscillating voltage source 23 while Bragg crystal 21 is activated by oscillating voltage source 25. Window 27 in housing 11 is of optical quality and is located about intersection point 17 for penetration of a laser beam which would enter perpendicular to the plane of the paper. A second window, not shown, appears at the opposite surface of housing 11. The two-dimensional Bragg cell 10 is protected by bubble vent 26. Bragg crystals 19 and 21 are mounted such that they can drive ultrasonically the two columns of water 13 and 15 with their respective center lines 29 and 31 lying in a common plane and intersecting in a right angle. Each crystal is driven at a convenient ultrasonic frequency by sources 23 and 25 such that its respective water column can diffract light through the wellknown Bragg effect. For most applications it is convenient to operate each crystal at a different driving frequency, henceforth called a carrier frequency, which is determined by the velocity components to be measured.

When one of the crystals is operated in the Bragg diffraction mode, an input beam of light can be split into two beams of equal intensity and with a difference in frequency equal to that of the carrier frequency. In a similar fashion, the second crystal can be made to diffract the two beams diffracted by the first water column. Thus, as shown in FIG. 2, when fully operable, the two-dimensional Bragg cell takes a single input beam 33 from laser 35 and generates a four beam output. The input laser beam 33 has a polarization vector denoted by arrow 37. Each output beam is different in frequency from any other beam by the carrier frequency of the crystals or by the sums and differences of the carrier frequencies. At any observation plane normal to the optical axis, each of the beams is spatially positioned on the corner of a rectangle 40 with the relative dimensions of the rectangle determined by the carrier frequencies of the two-dimensional Bragg crystal. All four beams appear to originate from a common point.

The beams exiting from the two-dimensional Bragg cell are numbered as 1, 2, 3 and 4, with 1 corresponding to the beam which has not been diffracted, and the other beams numbered subsequently on a clockwise fashion as they are viewed from the output side of the two-dimensional Bragg cell. The carrier frequencies, $f$, between the respective beams are as follows:

1. Between beams $(1, 2)$, $f = x$ (where $x$ is the carrier frequency as determined by the crystal which has its normal vector pointing parallel to the plane determined by $(1, 2)$).

2. Between beams $(3, 4)$, $f = x$

3. Between beams $(1, 4)$, $f = y$ (where $y$ is determined by the crystal which has its normal vector pointing parallel to the plane determined by $(1, 4)$).

4. Between beams $(2, 3)$, $f = y$.

5. Between beams $(1, 3)$, $f = x \pm y$ (the sign being chosen positive if the shifted frequency is above the center frequency or negative if below the center frequency).

6. Between beams $(2, 4)$, $f = x \pm y$.

It may be desirable to increase input laser power in the orthogonal components to be measured in order to eliminate the velocity components determined by beams $(1, 3)$ and $(2, 4)$. As shown in FIG. 2, a set of polarization rotation plates 39 could then be placed in the paths of the beams such that the polarization of the respective beams is as shown by the arrows prior to input into the transmitting lens. By proper positioning the polarization rotation plates it is also possible to eliminate the measurement of the orthogonal components and measure those components determined by beam sets $(2, 4)$ and $(1, 3)$.

As shown in FIG. 3, the beams from the two-dimensional Bragg crystal can be made to form an axis-symmetric quadruplet beam set and since there is a common center of divergence, lens 41 can be used to bring the beams to a common focus at a point 43 where the velocity is to be measured. The direction of the measured velocity components are shown by arrows 45 and 47. The usual fringe interpretation of the laser doppler velocimeter is applicable for analysis of the scattered signal detected by the collector package shown which includes light collection optics 49. However, it is noted that the fringe planes tavel in the same direction as the image of the traveling waves in the two-dimensional Bragg cell. This means that the laser doppler velocimeter signal is centered on carrier frequencies $x$ and $y$ and is higher or lower than $x$ and/or $y$ depending on whether the signal source travels in opposition to the direction of the image of the traveling wave or in the same direction, respectively.

Since the signals of the different component velocities are on different carrier frequencies, a single photomultiplier tube 51 can be used to detect both component signals. Through the use of electronic heterodyning and filtering techniques, the signals from the photomultiplier tube 51 can be separated and processed using a conventional doppler data processor 53 and signal separator 55 that are in use with prior art self-aligned laser doppler velocimeter systems.

What is claimed is:

1. A laser doppler velocimeter system comprising:
   a. a laser beam source;
   b. means for generating four output light beams from the laser beam with each light beam having a different frequency, the generating means including:
      1. a housing containing first and second intersecting columns of water,
      2. a pair of transparent members on opposite surfaces of the housing at the intersecting points of the water columns for passage of light from the laser beam source,
      3. a pair of Bragg crystals positioned one each in the first and second intersecting columns of water, and
      4. a pair of oscillators having different frequencies activating one each of the pair of Bragg crystals;
   c. a collimating lens intersecting the four output beams to focus upon a test point;
   d. four polarization rotation plates interposed between the beam generating means and the collimating lens with one each of the rotating plates positioned to intercept one each of the output light beams for eliminating predetermined velocity components; and
   e. means for collecting scattered light from the test point including
      1. a lens system intercepting the scattered light from the test point,
      2. a photomultiplier tube positioned to receive the light from the lens system,
      3. a carrier frequency separator fed by the photomultiplier tube, and
      4. a doppler data processor fed by the carrier frequency separator.

* * * * *